United States Patent
Fujisawa et al.

(10) Patent No.: US 9,187,626 B2
(45) Date of Patent: Nov. 17, 2015

(54) UNCOATED HOUSING AND METHOD FOR MANUFACTURING SAME

(75) Inventors: Tomoyuki Fujisawa, Tokyo (JP); Hiroharu Itaya, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 91 days.

(21) Appl. No.: 14/237,936

(22) PCT Filed: Aug. 10, 2012

(86) PCT No.: PCT/JP2012/070434
§ 371 (c)(1),
(2), (4) Date: Feb. 10, 2014

(87) PCT Pub. No.: WO2013/022084
PCT Pub. Date: Feb. 14, 2013

(65) Prior Publication Data
US 2014/0186565 A1    Jul. 3, 2014

(30) Foreign Application Priority Data
Aug. 11, 2011    (JP) .................................. 2011-176415

(51) Int. Cl.
| | |
|---|---|
| C08L 9/08 | (2006.01) |
| C08L 101/00 | (2006.01) |
| C08F 279/04 | (2006.01) |
| B29C 45/00 | (2006.01) |
| B29C 45/73 | (2006.01) |
| C08L 25/18 | (2006.01) |
| C08L 33/20 | (2006.01) |
| C08L 55/02 | (2006.01) |

(52) U.S. Cl.
CPC ............. *C08L 9/08* (2013.01); *B29C 45/0001* (2013.01); *B29C 45/73* (2013.01); *C08F 279/04* (2013.01); *C08L 25/18* (2013.01); *C08L 33/20* (2013.01); *C08L 55/02* (2013.01); *C08L 101/00* (2013.01); *Y10T 428/1397* (2015.01)

(58) Field of Classification Search
CPC ......... C08L 9/08; C08L 101/00; C08L 25/18; C08L 33/20; C08L 55/02; Y10T 428/1397; C08F 279/04; B29C 45/0001; B29C 45/73
See application file for complete search history.

(56) References Cited

U.S. PATENT DOCUMENTS

| | | | | |
|---|---|---|---|---|
| 4,009,227 | A | * | 2/1977 | Ott et al. .................. 525/71 |
| 2012/0178860 | A1 | | 7/2012 | Nakamoto et al. |
| 2013/0184409 | A1 | | 7/2013 | Fujisawa et al. |

FOREIGN PATENT DOCUMENTS

| | | |
|---|---|---|
| JP | 2002-292798 A | 10/2002 |
| JP | 2004-115726 A | 4/2004 |
| JP | 2004-124042 A | 4/2004 |
| JP | 2009-120705 A | 6/2009 |
| TW | 200523114 A | 7/2005 |
| TW | 200600342 A | 1/2006 |
| TW | 201107410 A | 3/2011 |
| WO | WO 2011/037172 A1 | 3/2011 |
| WO | WO 2012/043790 A1 | 4/2012 |

OTHER PUBLICATIONS

International Search Report, issued in PCT/JP2012/070434, dated Nov. 6, 2012.
Office Action issued Feb. 19, 2014, in Taiwan Patent Application No. 101129112.

* cited by examiner

*Primary Examiner* — Michael C Miggins
(74) *Attorney, Agent, or Firm* — Birch, Stewart, Kolasch & Birch, LLP

(57) ABSTRACT

The present invention is an uncoated housing in which a molded product formed from a thermoplastic resin composition (D) containing 20-60% by mass of an acetone insoluble resin component (A), which contains a rubber component (a) with an average particle size of 0.05-0.3 μm and has a coefficient of linear expansion of $11\times10^{-5}$-$20.5\times10^{-5}$, 40-80% by mass of an acetone soluble resin component (B) (here, (A)+(B)=100% by mass), and a colorant (C), with (1) the acetone soluble resin component (B) containing 6.0-45% by mass of an unsaturated nitrile monomer derived component and (2) 2-20% by mass of a component with a molecular weight of 70,000 or less by gel permeation chromatography (GPC) measurements being contained in the acetone soluble resin component (B). On the basis of JIS K7105, the L* value for this uncoated housing is 13 or less, the luster 60-120%, and the haze value 30-90%.

6 Claims, No Drawings

UNCOATED HOUSING AND METHOD FOR MANUFACTURING SAME

TECHNICAL FIELD

The present invention relates to an uncoated housing having excellent impact resistance, a deep color tone and an appearance with a sense of high quality, and a method for producing the same.

BACKGROUND ART

Recently, housings for various products made of resins are required to have not only impact resistance but also high designability. There is tendency that luxurious enamel touch with a deep color tone is required particularly mainly for a household electrical appliance, a game machine, an interior material for a vehicle and the like. It has conventionally been difficult to attain designability with enamel touch by using merely a resin, and hence, a housing with enamel touch has been obtained by a method of coating a molded resin article or adhering a decoration film precedently designed as desired onto a housing (see, for example, Patent Literature 1).

CITATION LIST

Patent Literature

Patent Literature 1: JP 2002-292798 A

SUMMARY OF INVENTION

Technical Problem

In employing the coating method, however, the number of processes increases and hence cost of the housing increases, and an organic solvent such as a thinner occupying substantially a half of the coating composition is entirely released to the air in the form of a volatile organic compound, and therefore, this method has a problem in which it is environmentally unpreferable. Alternatively, in employing the method of adhering a special film onto the surface of a molded resin article as in the invention disclosed in Patent Literature 1, it is apprehended that the adhered film may be peeled off from the molded resin article, and in addition, there is a problem in which the number of processes necessary for the production is increased similarly to the coating process.

Solution to Problem

As a result of earnest studies, the present inventors have specified conditions for exhibiting luxurious enamel touch with a deep color tone, and have found the following: A housing a molded article made of a thermoplastic resin composition (D) containing: an acetone insoluble resin component (A) consisting of a rubber component having a specific mass average particle size; an acetone soluble resin component (B) having a specific content of an unsaturated nitrile monomer-derived unit component and a specific molecular weight; and a coloring agent (C) has excellent impact resistance as well as can satisfy the conditions for exhibiting the enamel touch even without performing a coating process or a process of adhering a special film. Specifically, the present invention provides the following:

[1] An uncoated housing a molded article made of a thermoplastic resin composition (D) containing:

20 to 60% by mass of an acetone insoluble resin component (A) that contains a rubber component (a) having a mass average particle size of 0.05 to 0.3 µm and has a coefficient of linear expansion of $11\times10^{-5}$ to $20.5\times1°$ C., 40 to 80% by mass of an acetone soluble resin component (B) (wherein a content of the component (A)+a content of the component (B)=100% by mass); and a coloring agent (C), wherein (1) the acetone soluble resin component (B) contains 6.0 to 45% by mass of an unsaturated nitrite monomer-derived component, (2) the acetone soluble resin component (B) contains 2 to 20% by mass of a component having a molecular weight, measured by gel permeation chromatography (GPC), of 70,000 or less, and the housing has an L* value, according to JIS K7105, of 13 or less, a gloss of 60 to 120%, and a haze value of 30 to 90%.

[2] The uncoated housing according to [1], wherein the acetone soluble resin component (B) shows at least two peaks in a region of a molecular weight of 10,000 to 300,000 in GPC measurement.

[3] The uncoated housing according to [1] or [2], wherein an increase rate of the L* value in a fiber abrasion test is 60% or less.

[4] The uncoated housing according to any one of [1] to [3], wherein a falling dart impact 50% destruction energy according to JIS K7211-1976 of the thermoplastic resin composition (D) is 4.0 J or more.

[5] The uncoated housing according to any one of [1] to [4], wherein the coloring agent (C) is a mixture of dyes of at least 4 or more colors, and a sublimation starting temperature of each of the dyes is 210 to 400° C.

[6] A method for producing the uncoated housing according to any one of [1] to [5], wherein molding is performed at a mold temperature of 60 to 150° C. and an injection pressure of 300 to 1300 kg/cm² or less by using a mold having surface roughness Ra of 0.1 or less.

Advantageous Effects of Invention

According to the present invention, an uncoated housing having a deep color tone, an appearance with a sense of high quality and excellent impact resistance can be obtained without requiring a complicated process such as coating and film adhesion.

DESCRIPTION OF EMBODIMENTS

The present invention will now be specifically described.

The present invention uses a thermoplastic resin composition (D) comprising: 20 to 60% by mass of an acetone insoluble resin component (A) that contains a rubber component (a) having a mass average particle size of 0.05 to 0.3 µm and has a coefficient of linear expansion of $11\times10^{-5}$ to $20.5\times10^{-5}/°$ C.; 40 to 80% by mass of an acetone soluble resin component (B) (wherein a content of the component (A)+a content of the component (B)=100% by mass); and a coloring agent (C), in which (1) the acetone soluble resin component (B) contains 6.0 to 45% by mass of an unsaturated nitrile monomer-derived component, and (2) the acetone soluble resin component (B) contains 2 to 20% by mass of a component having a molecular weight, measured by gel permeation chromatography (GPC), of 70,000 or less.

The acetone insoluble resin component (A) in the present invention is a resin component that contains the rubber component (a) having a mass average particle size of 0.05 to 0.3 µm or less, and has a coefficient of linear expansion of $11 \times 10^{-5}$ to $20.5 \times 10^{-5}/°$ C. Such a resin component can be taken out of the thermoplastic resin composition (D) or a molded article made of the thermoplastic resin composition (D) by the following method:

Two dry centrifuge tubes are prepared for each sample. Each centrifuge tube is precedently dried at 80° C. for 30 minutes or more, and allowed to stand to cool in a desiccator for 15 minutes or more. Each of the centrifuge tubes is precisely weighed up to 0.1 mg with an electronic balance. Approximately 1 g of the thermoplastic resin composition (D) or the molded article is cut out and weighed into each of the centrifuge tubes, and the resulting tubes are precisely weighed up to 0.1 mg. Approximately 20 ml of acetone is collected in a measuring cylinder and put in each of the centrifuge tubes, and silicone stoppers are put in the tubes. The resulting tubes are shook with a shaker at a speed of 100 rpm with a vibration amplitude of 25 mm for 2 hours. After shaking, the resulting tubes are subjected to centrifugation. First, the silicone stoppers are taken out. At this point, the sample adhered onto each of the silicone stopper is put into the centrifuge tube with a slight amount of acetone. The two centrifuge tubes are set on a diagonal line in a rotor of a centrifuge. The centrifuge is operated for performing centrifugation at a speed of rotation of 20,000 rpm for 60 minutes (Hitachi high-speed cooled centrifuge). After completing the centrifugation, the centrifuge tubes are taken out of the rotor, and resultant supernatants are decanted. Approximately 20 ml of acetone is collected in a measuring cylinder and put in each of the centrifuge tubes, silicone stoppers are put in the tubes and the resulting tubes are shook at a speed of 100 rpm with a vibration amplitude of 25 mm for 1 hour. The centrifuge is operated again for performing the centrifugation at a speed of rotation of 20,000 rpm for 50 minutes. After completing the centrifugation, the centrifuge tubes are taken out of the rotor, and resultant supernatants are decanted. Furthermore, approximately 20 ml of acetone is collected in a measuring cylinder and put in each of the centrifuge tubes, silicone stoppers are put in the tubes and the resulting tubes are shook at a speed of 100 rpm with a vibration amplitude of 25 mm for 1 hour. The centrifuge is operated for performing the centrifugation at a speed of rotation of 20,000 rpm for 50 minutes. After completing the centrifugation, the centrifuge tubes are taken out of the rotor, and resultant supernatants are decanted. After drying the resultants at 80° C. for 30 minutes, the resultants are further dried at 130° C. for 30 minutes. After the drying, the resultants are allowed to stand to cool in a desiccator for 30 minutes or more. After allowing them to stand to cool sufficiently, each of the resultant samples is precisely weighed up to 0.1 mg with an electronic balance.

The thermoplastic resin composition (D) or the molded article made of the thermoplastic resin composition (D) may additionally contain an acetone insoluble component apart from the acetone insoluble resin component (A) in some cases, and in such a case, what is left after removing the additionally contained acetone insoluble component from the ultimate product obtained as described above corresponds to the acetone insoluble resin component (A).

For measurement of the coefficient of linear expansion of the acetone insoluble resin component (A), a sample with a thickness of 5 mm is obtained by compression molding the acetone insoluble resin component (A) at 260° C. and a pressure of 80 kg/cm², and the sample is subjected to the measurement conducted in accordance with ASTM D696 by using TMA in a temperature range of −30° C. to 60° C.

If the acetone insoluble resin component (A) taken out of the thermoplastic resin composition (D) of the present invention or a molded article made of the thermoplastic resin composition (D) is to be measured for the coefficient of linear expansion, a mixture of the acetone insoluble resin component (A) and an additionally contained acetone insoluble component may be obtained in some cases by employing the aforementioned method for obtaining the acetone insoluble resin component (A). If the additionally contained acetone insoluble component is contained in, for example, 2% by mass or less of the entire acetone insolubles, the coefficient of linear expansion can be measured by using a sample with a thickness of 5 mm obtained by compression molding this mixture at 260° C. and a pressure of 80 kg/cm².

The acetone insoluble resin component (A) contains the rubber component (a) or a graft copolymer (G) obtained by grafting the rubber component (a) with some (co)polymer (F) and the like. As the rubber component (a), any rubber component having a glass transition temperature of 0° C. or less can be used.

Specifically, a conjugated diene rubber such as polybutadiene, a styrene-butadiene copolymer rubber, an acrylonitrile-butadiene copolymer rubber, polyisoprene, polychloroprene, a styrene-butadiene block copolymer rubber, a styrene-isoprene block copolymer rubber, or an ethylene-propylene-diene terpolymer rubber, an acrylic rubber such as butyl polyacrylate, an ethylene-propylene rubber, a silicone rubber, a silicone-acrylic composite rubber, or a hydrogenated product or the like of these can be used. Among these, a conjugated diene polymer is preferably used, and polybutadiene, a styrene-butadiene copolymer rubber or an acrylonitrile-butadiene copolymer rubber is particularly preferably used. Among these, polybutadiene, a styrene-butadiene copolymer, a block copolymer of styrene-butadiene, and an acrylonitrile-butadiene copolymer are preferably used from the viewpoint of impact resistance.

The mass average particle size of the rubber component (a) is 0.05 to 0.3 µm, preferably 0.08 to 0.15 µm, and more preferably 0.1 to 0.15 µm. From the viewpoint of the impact property, it is 0.05 µm or more, and from the viewpoint of gloss, it is 0.3 µm or less.

If the rubber component (a) contained in a molded article is to be measured for the mass average particle size, a transmission electron microscope (TEM) photograph may be subjected to image analysis for the measurement, and if the rubber component (a) used as a raw material of the thermoplastic resin composition (D) is to be measured for the mass average particle size, a microtrac grain size analysis instrument "nanotrac 150" manufactured by Nikkiso Co., Ltd. is used for the measurement.

As a method for the image analysis, an ultrathin section with a thickness of 60±2 nm is cut out of a molded article and dyed with, for example, osmic acid if butadiene is used, and the resultant piece is observed with a transmission electron microscope (TEM). If the rubber component is contained in the thermoplastic resin composition in the present invention, substantially circular dark portions are observed. The photograph of the ultrathin section is analyzed in an arbitrary region of 50 µm×50 µm with image analysis software ("A-zo kun" manufactured by Asahi Kasei Engineering Corporation), so as to calculate the mass average particle size of the substantially circular dark portions by using a function provided in the image analysis software.

An example of the (co)polymer (F) grafted with the rubber component (a) is a co(polymer) containing one or more monomers selected from aromatic vinyl monomers, unsaturated nitrile monomers and unsaturated alkyl carboxylate monomers. The (co)polymer (F) may contain another monomer copolymerizable with an aromatic vinyl monomer, an unsaturated nitrile monomer and an unsaturated alkyl carboxylate monomer.

Examples of the aromatic vinyl monomers are styrene, α-methyl styrene, o-methyl styrene, p-methyl styrene, o-ethyl styrene, p-ethyl styrene, p-t-butyl styrene and vinyl naphthalene, and especially, styrene and α-methyl styrene are preferably used. One of these monomers or two or more of them can be used.

Examples of the unsaturated nitrile monomers are acrylonitrile, methacrylonitrile and ethacrylonitrile, and especially, acrylonitrile is preferably used. One of these monomers or two or more of them can be used.

Examples of the unsaturated alkyl carboxylate monomers are acrylate and methacrylate compounds such as butyl acrylate, ethyl acrylate, methyl acrylate and methyl methacrylate, and acrylic acids such as acrylic acid and methacrylic acid.

Examples of another copolymerizable monomer are maleic anhydride, N-substituted maleimide monomers such as N-phenylmaleimide and N-methylmaleimide, and glycidyl group-containing monomers such as glycidyl methacrylate. One of these monomers or two or more of them can be used.

Specific examples of the (co)polymer (F) are polymers such as a styrene polymer, an acrylonitrile polymer, a methyl methacrylate polymer and a butyl acrylate polymer, an acrylonitrile-styrene copolymer, an acrylonitrile-methyl methacrylate copolymer, a methyl acrylate-methyl methacrylate copolymer, a styrene-methyl methacrylate copolymer, an acrylonitrile-α-methyl styrene copolymer, a styrene-N-phenylmaleimide copolymer, an acrylonitrile-styrene-butyl acrylate copolymer, an acrylonitrile-styrene-methyl methacrylate copolymer, and an acrylonitrile-styrene-N-phenylmaleimide copolymer. Among these (co)polymers, an acrylonitrile-styrene copolymer, an acrylonitrile-methyl methacrylate copolymer, a methyl acrylate-methyl methacrylate copolymer, a styrene-methyl methacrylate copolymer, an acrylonitrile-styrene-butyl acrylate copolymer and an acrylonitrile-styrene-methyl methacrylate copolymer are preferably used.

Examples of a method for producing the graft copolymer (G) are emulsion polymerization, suspension polymerization, block polymerization, solution polymerization, and a combination of these polymerization methods. A specific example is emulsion graft polymerization in which the (co)polymer (F) is graft polymerized with a latex of the rubber component (a) produced by emulsion polymerization. Incidentally, any of a continuous system, a batch system and a semi-batch system can be employed. A ratio of the (co)polymer (F) grafted with the rubber component (a), which is produced during the production of the graft copolymer (G), is preferably 10 to 200 parts by mass and more preferably 20 to 170 parts by mass based on 100 parts by mass of the rubber component. The ratio of the grafted component can be obtained by absorption peak analysis obtained by using a Fourier transform infrared spectrophotometer (FT-IR). The rubber component is contained in the acetone insoluble resin component (A) in a content of preferably 10 to 100% by mass, more preferably 30 to 70% by mass, and particularly preferably 40 to 60% by mass.

The thermoplastic resin composition (D) used in the present invention contains 20 to 60% by mass of the acetone-insoluble resin component (A). From the viewpoint of releasability in injection molding and the impact property, the content of the acetone-insoluble resin component (A) is 20% by mass or more, and from the viewpoint of moldability and development of the enamel touch, the content is 60% by mass or less. The content of the acetone insoluble resin component (A) in the thermoplastic resin composition (D) is preferably 25 to 55% by mass and more preferably 30 to 45% by mass.

The acetone insoluble resin component (A) of the present invention has a coefficient of linear expansion of $11 \times 10^{-5}$ to $20.5 \times 10^{-5}/°$ C. It is preferably $12.5 \times 10^{-5}$ to $19 \times 10^{-5}/°$ C. and more preferably $12.5 \times 10^{-5}$ to $17 \times 10^{-5}/°$ C. When the coefficient of linear expansion is set at $20.5 \times 10^{-5}/°$ C. or less, the resulting housing can attain a haze value of 30% or more. Besides, when the coefficient of linear expansion is set at $11 \times 10^{-5}/°$ C. or more, the resulting housing can attain a haze value of 90% or less and sufficient impact resistance.

The acetone soluble resin component (B) of the present invention is a resin component containing: (1) 6.0 to 45% by mass of an unsaturated nitrile monomer-derived component; and (2) 2 to 20% by mass of a component having a molecular weight, measured by the gel permeation chromatography (GPC), of 70,000 or less, and can be taken out, as a component other than the acetone insoluble, from the thermoplastic resin composition (D) or a molded article made of the thermoplastic resin composition (D).

Incidentally, in the case where the thermoplastic resin composition (D) of the present invention or a molded article made of the thermoplastic resin composition (D) contains an acetone soluble component other than the acetone soluble resin component (B), if the content of such an additionally contained acetone soluble component is 2% by mass or less of the entire acetone insolubles, what is left after removing the acetone insoluble component from a sample of the thermoplastic resin composition (D) or a molded article made of the thermoplastic resin composition (D) can be regarded as the content of the acetone soluble resin component (B).

The acetone soluble resin component (B) contains 6.0 to 45% by mass of an unsaturated nitrile monomer-derived unit component. In addition, the acetone soluble resin component (B) contains 16.5 to 82% by mass of one or more monomers selected from aromatic vinyl monomers, unsaturated alkyl carboxylate monomers, and other monomers copolymerizable with these monomers.

A preferable example of an unsaturated nitrile monomer is acrylonitrile, preferable examples of the aromatic vinyl monomers are styrene and α methyl styrene, and preferable examples of the unsaturated alkyl carboxylate monomers are butyl acrylate, ethyl acrylate, methyl acrylate and methyl methacrylate. Among these, preferable examples of a copolymer contained in the acetone soluble resin component (B) are a styrene-acrylonitrile copolymer, a styrene-acrylonitrile-butyl acrylate copolymer, a styrene-acrylonitrile-methyl methacrylate copolymer, a styrene-acrylonitrile-methyl acrylate copolymer, an acrylonitrile-methyl methacrylate copolymer, an acrylonitrile-methyl acrylate copolymer and an acrylonitrile-methyl acrylate copolymer.

In preparing such a copolymer, the content of the unsaturated nitrile monomer-derived unit component in the copolymer is preferably 20 to 45% by mass, more preferably 21 to 43% by mass, and further more preferably 22 to 40% by mass. From the viewpoint of the impact property, the content is 20% by mass or more, and from the viewpoint of the moldability, the content is 45% by mass or less.

Furthermore, such a copolymer is preferably contained in the acetone soluble resin component (B) in a content of preferably 30 to 100% by mass, more preferably 40 to 100% by mass, and further more preferably 50 to 100% by mass.

From the viewpoint of balance between the impact property and the moldability, the acetone soluble resin component (B) used in the present invention preferably has 2 or more and less than 5 peaks in a region of a molecular weight of 10,000 to 300,000 measured by the GPC. The mass average molecular weight of the acetone soluble resin component (B) as a whole is 10,000 or more from the viewpoint of the impact property, and is 300,000 or less from the viewpoint of the moldability. The mass average molecular weight is preferably 10,000 to 250,000, and particularly preferably 10,000 to 200,000.

Furthermore, from the viewpoint of balance between flow properties and the impact property, it is necessary for the acetone soluble resin component (B) to contain 2 to 20% by mass of a component having a molecular weight of 70,000 or less measured by the GPC.

The acetone soluble resin component (B) has a molecular weight distribution (the mass average molecular weight/the number average molecular weight) of preferably 1.5 to 5.0 and more preferably 1.8 to 4.0 from the viewpoint of the impact property and the moldability.

The mass average molecular weight and the number average molecular weight of the acetone soluble resin component (B) are measured by the GPC. Monodisperse standard polystyrene having a known mass average molecular weight and an analysis gel column priorly eluting a high molecular weight component are used so that a calibration curve can be precedently prepared on the basis of the elution time and the mass average molecular weight. On the basis of the thus obtained calibration curve, the molecular weight of each sample can be obtained.

The thermoplastic resin composition (D) used in the present invention contains 40 to 80% by mass of the acetone soluble resin component (B). From the viewpoint of the moldability and the development of the enamel touch, the content of the acetone soluble resin component (B) is 40% by mass or more, and from the viewpoint of the releasability in the injection molding and the impact property, the content is 80% by mass or less. The content of the acetone soluble resin component (13) in the thermoplastic resin composition (D) is preferably 45 to 75% by mass and more preferably 55 to 70% by mass.

A difference in the refractive index between the acetone insoluble resin component (A) and the acetone soluble resin component (B) contained in the uncoated housing of the present invention is preferably smaller. As a method for reducing the difference in the refractive index, a method in which a component having a refractive index close to that of the acetone insoluble resin component (A) is contained in the acetone soluble resin component (B), or a method in which a graft ratio is increased if the acetone insoluble resin component (A) is a graft copolymer can be employed.

The refractive index is measured by using, for example, an Abbe refractometer or a laser refractometer. If an Abbe refractometer or a laser refractometer is used for measuring the refractive index, each of the acetone insoluble resin component (A) and the acetone soluble resin component (B) is formed into a film with a size of 30 mm×30 mm×0.2 mm (thickness) to be used as a sample. The film is preferably prepared by, for example, press molding because the orientation is less affected by this method. In the measurement of the refractive index, different methods should be employed in some cases for respectively measuring the refractive indexes of the acetone soluble resin component (B) and the acetone insoluble resin component (A) depending upon types of samples. In such a case, the refractive indexes are measured by using light of the same wavelength.

The coloring agent (C) used in the present invention is a pigment, a dye or the like used for coloring.

The pigment refers to an organic pigment and an inorganic pigment, and the organic pigment refers to a natural organic pigment and a synthetic organic pigment.

The natural organic pigment refers to a vegetable pigment, an animal pigment and a mineral pigment, and the synthetic organic pigment refers to a dyed lake pigment, a soluble azo pigment, an insoluble azo pigment, a condensed azo pigment, an azo complex salt pigment, a phthalocyanine pigment, a condensed polycyclic pigment, a fluorescent pigment, and the like. Examples of these pigments are disazo pigments, benzimidazolone pigments, monoazo lake pigments, isoindolinone pigments, anthraquinone pigments, condensed azo pigments, quinacridone pigments, perylene pigments, diketo pyrrolo pyrrole pigments, phthalocyanine pigments and indigoid pigments.

The inorganic pigment refers to a natural inorganic pigment and a synthetic inorganic pigment, and the natural inorganic pigment refers to a soil pigment, calcined soil, a mineral pigment and the like. The synthetic inorganic pigment refers to an oxide pigment, a hydroxide pigment, a sulfide pigment, a silicate pigment, a phosphate pigment, a carbonate pigment, a metal powder pigment, a carbon pigment and the like. Examples of these pigments are zinc oxide, white lead, lithopone, titanium dioxide, barium sulfate, baryta powder, red lead, iron oxide, chrome yellow, zinc, ultramarine and carbon black. Examples of the dye are a nitroso dye, a nitro dye, an azo dye, a stilbene azo dye, a keto imine dye, a triphenyl methane dye, a xanthene dye, an acridine dye, a quinoline dye, a methine/polymethine dye, a thiazole dye, an indamine/indophenol dye, an azine dye, an oxazine dye, a thiazine dye, a sulfur dye, an aminoketone/oxyketone dye, an anthraquinone dye, an indigoid dye and a phthalocyanine dye.

In order to show the appearance with the enamel touch, the uncoated housing of the present invention needs to have a gloss according to JIS K7105 of 60% to 120%, a haze value according to JIS K7105 of 30% to 90%, and an L* value according to JIS K7105 of 13 or less.

In order to produce the housing of the present invention having a gloss according to JIS K7105 of 60% to 120%, the thermoplastic resin composition (D) used in the present invention is molded, at an injection pressure of 300 to 1300 kg/cm$^2$ or less, by using a mold having a temperature kept at 60 to 150° C. and having surface roughness Ra of 0.1 or less. The gloss is more preferably 70 to 100% and further more preferably 80 to 100%.

In order to produce the housing of the present invention having a haze value according to JIS K7105 of 30% to 90%, the thermoplastic resin composition (D) used in the present invention is molded, at an injection pressure of 300 to 1300 kg/cm$^2$ or less, by using a mold having a temperature kept at 60 to 150° C. and having surface roughness Ra of 0.1 or less. The haze value is more preferably 50 to 80%.

In order to produce the housing of the present invention having an L* value according to JIS K7105 of 13 or less, the thermoplastic resin composition (D) used in the present invention is molded, at an injection pressure of 300 to 1300 kg/cm$^2$ or less, by using a mold having a temperature kept at 60 to 150° C. and having surface roughness Ra of 0.1 or less. The L* value is more preferably 12 or less and further more preferably 11 or less.

In order to attain the gloss, the haze value and the L* value falling in more preferable ranges, the molding temperature may be set at a temperature higher, by 100 to 150° C. or more, than the glass transition temperature or the melting point of a polymer contained in the acetone soluble resin component (B). In using, for example, an ABS resin, rubber modified polystyrene or a methyl methacrylate resin, the molding temperature is set at 220 to 260° C., and in using a resin containing polycarbonate, the molding temperature is set at 260 to 300° C.

In order to attain the gloss, the haze value and the L* value falling in further more preferable ranges, coloring agents of three or more colors may be used as the coloring agent (C). In this case, a red coloring agent, a yellow coloring agent and a green coloring agent are preferably used. More preferably, coloring agents of four colors are used in combination, and in this case, a blue coloring agent, a violet coloring agent, an orange coloring agent or the like is preferably used in addition to a red coloring agent, a yellow coloring agent and a green coloring agent. Most preferably, a combination of a red coloring agent, a yellow coloring agent, a green coloring agent and a blue coloring agent, or a combination of a red coloring agent, a yellow coloring agent, a green coloring agent and a violet coloring agent is employed.

A red coloring agent herein means a coloring agent having Coloring Index named with Red, and similarly, a yellow coloring agent, a blue coloring agent, a green coloring agent, a violet coloring agent and an orange coloring agent are coloring agents having Coloring Indexes respectively named with Yellow, Blue, Green, Violet and Orange respectively. Specifically, for example, a red coloring agent refers to Pigment Red, Solvent Red and Disperse Red.

Particularly when a dye is used as the coloring agent (C), one having a sublimation starting temperature of 210 to 400° C. is preferably used from the viewpoint of securing a stable color tone. The sublimation starting temperature of a dye means a temperature at which decomposition of the dye starts, and it is preferably suitable to a temperature for preparing a resin or a molding temperature, and is more preferably 210 to 380° C. and most preferably 220 to 350° C. The sublimation starting temperature is varied depending upon the structure of a dye, and dyes having sublimation starting temperatures within a specific range are preferably combined for use. Furthermore, dyes having sublimation starting temperatures close to one another are preferably selected, and the range is preferably within 100° C. If sublimation starting temperatures are close to one another, color tone change caused by heat is small among the dyes, and hence, the color tone as a whole is not largely shifted from the original color tone.

The sublimation starting temperature of the coloring agent (C) can be measured by a method in which change in weight is measured at a given rate of temperature increase in the presence of or the flow of an inert gas such as nitrogen or helium, such as thermogravimetric analysis (TGA).

For attaining the enamel touch with a deep color tone, the coloring agent is contained in the thermoplastic resin composition (D) preferably in a content of 0.01% by mass or more, and from the viewpoint that mold staining can be made difficult to occur, it is contained preferably in a content of 2% by mass or less. The content of the coloring agent is varied depending upon a coloring agent to be used, and is adjusted to attain the haze value of 90% or lower. If a dye, carbon black or an inorganic pigment is used, the content is preferably 0.01 to 1% by mass, and if an organic pigment is used, the content is preferably 0.01 to 2% by mass.

Pyrolysis gas chromatography and a Fourier transform infrared spectrophotometer (FT-IR) (manufactured by JASCO Corporation) can be employed for identifying monomers and for calculating component ratios of the monomers contained in the acetone soluble resin component (B) and the acetone insoluble resin component (A) contained in the thermoplastic resin composition (D) used for producing the uncoated housing of the present invention.

In identifying the content of the unsaturated nitrite monomer-derived component contained in the acetone soluble resin component (B) by the analysis using the FT-IR, a component ratio of an unsaturated nitrite monomer is calculated on the basis of an integrated value of a nitrite group and an integrated value of a functional group representing a monomer copolymerizable with the unsaturated nitrile monomer by carbon nuclear magnetic resonance measurement ($^{13}$C-NMR). Specific examples of the functional group representing a monomer copolymerizable with the unsaturated nitrile monomer are carbon in the 4-position of a phenyl group in using styrene, and carbon of an ester group in using methyl methacrylate.

In the uncoated housing of the present invention, an increase rate of the L* value in a fiber abrasion test can be 60% or less. This is because the enamel touch is preferably not degraded through a cleaning/wiping operation or the like at a level generally performed in actual use as a housing. It is because faint scratches are caused on the surface of an injection-molded article that the enamel touch is degraded through a wiping operation. As a barometer of gloss and color tone (L* value) retainability, namely, the scratch resistance, a fiber abrasion test can be employed. The fiber abrasion test is a test for determining the degree of scratches by rubbing a surface of an injection-molded article with a tissue. Through evaluation of the test performed by rubbing the surface through 20 reciprocating motions at a rubbing load of 500 g, a stroke of 60 mm and a speed of 50 mm/sec, a daily conducted cleaning/wiping operation for the housing can be reproduced.

The increase of an L* value of the surface of the injection-molded article attained after the test, as compared with the value obtained before the test, can be 60% or less, and furthermore, the increase can be reduced to 30% or less, or further to 5% or less.

In order to attain the increase of the L* value in the fiber abrasion test falling in the preferable range, the coefficient of linear expansion of the acetone insoluble resin component (A) is set within the range of $11\times10^{-5}$ to $20.5\times10^{-5}$/° C., and an injection speed employed in molding the housing by the injection molding is adjusted to fall in a range of 1 to 50 mm/s. Furthermore, the increase of the L* value falling in the preferable range can be more easily attained by adding a lubrication assistant agent to the thermoplastic resin composition (D).

The injection speed herein does not mean a cylinder speed of an injection molder but means a speed at which the resin flows within a cavity of a mold product. This speed can be obtained by dividing, with a product cavity area, an injected resin volume per unit time obtained based on the diameter and the speed of a cylinder. Specifically, assuming, for example, that a resin is injected into a product cavity having a thickness of 4 mm, a width of 10 mm and a length of 120 mm with a cylinder having a diameter of φ30 at a cylinder speed of 5 mm/s, the aforementioned numerical values are obtained as follows:

Product cavity area: $4\times10=40$ mm$^2$

Injected resin volume per unit time: $15\times15\times3.14\times5=3532.5$ mm$^3$/S Injection speed: $3532.5/40=88.3125$ mm/s The following methods may be employed for controlling the coefficient of linear expansion of the acetone insoluble resin component (A) to fall in a specific range:

1) A graft copolymer is used as the acetone insoluble resin component (A) and a graft ratio thereof is increased;

2) the degree of crosslinking of the rubber component (a) of the acetone insoluble resin component (A) is increased;

3) the glass transition temperature (Tg) of the rubber component (a) of the acetone insoluble resin component (A) is increased.

When the method 1) is employed, the coefficient of linear expansion can be controlled without largely depending upon the degree of crosslinking or the Tg of the rubber component (a). When the graft ratio is increased, the coefficient of linear expansion is lowered, and when the graft ratio is lowered, the coefficient of linear expansion is increased. The graft ratio can be adjusted, in preparing the graft copolymer, by increasing/decreasing the mass of monomers to be grafted as compared with the mass of the rubber component (a). For increasing the graft ratio, the mass of the monomers to be grafted should be increased as compared with the mass of the rubber component (a).

On the other hand, when the coefficient of linear expansion of the acetone insoluble resin component (A) is controlled by the method 2), the coefficient of linear expansion is lowered by increasing the degree of crosslinking, and the coefficient of linear expansion is increased by lowering the degree of crosslinking. A swelling index is preferably used as an index corresponding to the degree of crosslinking of the rubber component (a). The swelling index is preferably 10 to 80 and more preferably 15 to 60. When the swelling index is controlled to fall in this range, the coefficient of linear expansion of the acetone insoluble resin component (A) can be controlled to fall in the preferable range. The swelling index can be controlled, if the rubber component (a) is prepared through, for example, emulsion polymerization, by employing a method of, for example, setting a polymerization temperature high, increasing a degree of polymerization conversion attained in completing the polymerization, or performing the polymerization with a monomer/polymer concentration ratio under polymerization set to be small. Thus, the swelling index is lowered, so as to increase the degree of crosslinking. Furthermore, when a crosslinkable monomer such as divinyl benzene is used to be copolymerized, the swelling index can be also lowered.

When the method 3) is employed, the coefficient of linear expansion is lowered by raising the glass transition temperature (Tg), and the coefficient of linear expansion is increased by lowering the glass transition temperature (Tg). From the viewpoint of the impact resistance of the acetone insoluble resin component (A), the Tg of the rubber component (a) is preferably approximately −100 to 0° C. The Tg is more preferably −20 to −90° C. When the Tg of the rubber component (a) is made close to the upper limit of 0° C. by adjusting the compositions of monomers which consist of the acetone insoluble resin component (A), the coefficient of linear expansion can be reduced. As a method for controlling the Tg of the rubber component (a), a copolymer is used as the rubber component (a) and the composition ratio of the copolymer is adjusted. In using, for example, a styrene-butadiene block copolymer, the Tg of the rubber component (a) can be increased by lowering the ratio of butadiene in a block portion principally containing butadiene. The coefficient of linear expansion of the acetone insoluble resin component (A) can be controlled by employing a single one of or a combination of the above-described methods 1) to 3). Among these methods, the method using a graft ratio for the control is preferably employed because the impact property and the appearance with the enamel touch can be well balanced in employing this method.

Examples of the lubrication assistant agent are lubricants such as aliphatic metal salts, olefins, a polyester elastomer and a polyamide elastomer. As the lubricants such as aliphatic metal salts, at least one or more lubricants having a fatty acid metal salt and an amide group or an ester group is preferably contained. A fatty acid metal salt is a salt of a fatty acid and a metal containing one or more selected from sodium, magnesium, calcium, aluminum and zinc. Examples thereof are preferably sodium stearate, magnesium stearate, calcium stearate, aluminum (mono-, di- or tri-) stearate, zinc stearate, sodium montanate, calcium montanate, calcium ricinoleate and calcium laurate, and among these, sodium stearate, magnesium stearate, calcium stearate and zinc stearate are preferred. Particularly preferably, stearic acid metal salts are used, and specifically, calcium stearate is preferably used. Examples of the olefins are compositions produced from at least one of ethylene, propylene, α-olefin and the like, and compositions derived from these compositions are included. Examples thereof are polypropylene, an ethylene-propylene copolymer, (high density, low density or linear low density) polyethylene, oxidized polyolefin and graft polyolefin. Oxidized polyolefin wax and polyolefin grafted with a styrene resin are preferred, and more preferably, polypropylene wax, polyethylene wax, oxidized polypropylene wax, oxidized polyethylene wax, acrylonitrile-styrene copolymer graft polypropylene, acrylonitrile-styrene copolymer graft polyethylene, styrene polymer graft polypropylene and styrene polymer graft polyethylene are used. Examples of the polyester elastomer are polyesters obtained through polycondensation of a dicarboxylic acid compound and a dihydroxy compound, through ring-opening polycondensation of an oxycarboxylic acid compound and a polycondensed lactone compound, or through polycondensation of a mixture of these component compounds. Either of homopolyester or copolyester can be used to obtain the effect of the present invention. Examples of the dicarboxylic acid compound are aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethane dicarboxylic acid and sodium 3-sulfoisophthalate; aliphatic dicarboxylic acids such as 1,4-cyclohexane dicarboxylic acid, 1,2-cyclohexane dicarboxylic acid and dicyclohexyl-4,4-dicarboxylic acid; aliphatic dicarboxylic acids such as diphenyl ether dicarboxylic acid, diphenyl ethane dicarboxylic acid, succinic acid, oxalic acid, adipic acid, sebacic acid, and dodecane dicarboxylic acid; and mixtures of any of these dicarboxylic acids, and the dicarboxylic acid compound also includes alkyl-, alkoxy- or halogen-substituted derivatives of these dicarboxylic acids. Furthermore, such a dicarboxylic acid compound can be used in the form of a derivative capable of forming an ester, for example, in the form of a lower alcohol ester such as dimethyl ester. In the present invention, one of these dicarboxylic acid compounds can be singly used or two or more of them can be used in combination. Among the aforementioned dicarboxylic acid compounds, terephthalic acid, isophthalic acid, 1,4-cyclohexane dicarboxylic acid, sebacic acid, adipic acid and dodecane dicarboxylic acid are preferably used from the viewpoint of a polymerization property, a color tone and the physical property. Examples of the dihydroxy compound are ethylene glycol, propylene glycol, butane diol, neopentyl glycol, butene dial, hydroquinone, resorcin, dihydroxy diphenyl ether, cyclohexane diol, hydroquinone, resorcin, dihydroxy diphenyl ether, cyclohexane diol and 2,2-bis(4-hydroxyphenyl)propane; and the dihydroxy compound includes polyoxyalkylene glycols, and alkyl-, alkoxy- or halogen-substituted derivatives thereof. One of these dihydroxy compounds can be singly used, or two or more of them can be used in combination. Examples of the oxycarboxylic acid compound are oxybenzoic acid, oxynaphthoic acid and diphenylene oxycarboxylic acid, and the oxycarboxylic acid compound also includes alkyl-, alkoxy- and halogen-substituted derivatives of these compounds. One of these oxycarboxylic acid compounds can be singly used, or two or more of them can be used in combination. Alternatively, a lactone compound such as ε-caprolactone can be used for producing the polyester elastomer. Examples of the polyamide elastomer are aminocarboxylic acid or lactam having a carbon number of 6 or more, and nylon mn salts in which m+n is 12 or more. Examples of a hard segment (X) thereof are aminocarboxylic acids such as ω-aminocaproic acid, ω-aminoenan acid, ω-aminocapryl acid, ω-aminobergon acid, ω-amino capric acid, 11-aminoundecanoic acid and 12-aminododecanoic acid; lactams such as caprolactam and laurolactam; and nylon salts such as nylon 6,6, nylon 6,10, nylon 6,12, nylon 11,6, nylon 11,10, nylon 12,6, nylon 11,12, nylon 12,10, and nylon 12,12. Furthermore, examples of a soft segment (Y) of polyol or the like are polyethylene glycol, poly(1,2- and 1,3-propyleneoxide) glycol, poly(tetramethylene oxide)glycol, poly(hexamethylene oxide)glycol, a block or random copolymer of ethylene oxide and propylene oxide, and a block or random copolymer of ethylene oxide and tetrahydrofuran. Such a soft segment (Y) has preferably a number average molecular weight of 200 to 6000 and more preferably of 250 to 4000. It is noted that poly(alkylene oxide)glycol having both terminals aminated or carboxylated can be used in the present invention. Among these lubrication assistant agents, a combination of a stearic acid metal salt and a wax is particularly preferably used. When the lubrication assistant agent is added, an acid-modified or epoxy-modified resin can be mixed for improving the compatibility. Besides, each of the acetone insoluble resin component (A) and the acetone soluble resin component (B) can be partially acid-modified or epoxy-modified as long as the enamel touch is not impaired. As an example of such modification, a vinyl monomer having a carboxyl group or a glycidyl group is copolymerized. Examples of the vinyl monomer having a carboxyl group are unsaturated compounds having a free carboxyl group such as acrylic acid, crotonic acid, cinnamic acid, itaconic acid and maleic acid; and unsaturated compounds having an acid anhydride carboxyl group such as maleic anhydride, itaconic anhydride, chloromaleic anhydride and citraconic anhydride, and among these, acrylic acid, methacrylic acid and maleic anhydride are suitably used. Examples of the vinyl monomer having a glycidyl group are glycidyl methacrylate, glycidyl acrylate, allyl glycidyl ether, methyl glycidyl ether and methyl glycidyl methacrylate, and among these, glycidyl methacrylate is suitably used.

In the uncoated housing of the present invention, a falling dart impact 50% destruction energy according to JIS K7211-1976 can be 4.0 J or more and 10 J or less.

In order to attain a falling dart impact 50% destruction energy of 4.0 J or more, the energy can be varied by controlling the content of rubber and the mass average molecular weight of the acetone soluble resin component (B). Specifically, the falling dart impact 50% destruction energy can be increased by increasing the content of rubber or increasing the mass average molecular weight of the acetone soluble resin component (B).

The falling dart impact 50% destruction energy can be evaluated according to JIS K7211-1976. A 2-type spherical striker (having a mass of 1±0.05 kg and a size with a diameter of approximately 63 mm) is used as the weight, and 50% impact-failure heights of 20 test pieces are obtained under environments under a temperature of 23° C. and humidity of 50±5%, and the thus obtained heights are converted into energy.

Specifically, the following expressions (1) and (2) are used for calculation:

$$H_{50}(50\% \text{ destruction height})=H_1+d[\Sigma(i+ni)/N\pm1/2] \quad (1)$$

$$E_{50}(50\% \text{ destruction energy})=m\times g\times H_{50} \quad (2)$$

In these expressions, the followings are substituted for the calculation:

$H_1$: a test height (cm) corresponding to a height level (i) of 0;

d: a height interval (cm) in increasing/decreasing the test height;

i: a height level incremented/decremented by 1 from 0 corresponding to the test height $H_1$;

ni: the number of test pieces having a failure (or no failure) at each level;

N: the total number of test pieces having a failure (or no failure);

m: the weight (kg) of the striker; and g: gravitational acceleration (9.80665 m/S$^2$).

In the present invention, $H_1$ is set at 60 cm, d is set at 2.5 cm and m is set at 1 kg for the measurement and calculation.

The uncoated housing of the present invention has notched Charpy impact strength according to ISO 179 of 5 kJ/m$^2$. The Charpy impact strength of 5 kJ/m$^2$ or more is preferred from the viewpoint of transportation and use of the product, and the Charpy impact strength can be varied by controlling the content of rubber, the mass average molecular weight of the acetone soluble resin component (B), or the like.

The uncoated housing of the present invention is molded by using a mold having surface roughness (Ra) of 0.1 or less. The surface roughness Ra is more preferably 0.05 or less. The gloss of the housing is varied in accordance with the surface roughness of a used mold and the molding conditions. When the mold has small surface roughness, a mold temperature is high and a molding pressure is low, the gloss of the surface of the resulting housing becomes high.

In order to attain the surface roughness (Ra) of the mold of 0.1 or less, the mold surface is finished with a file of a grit size of #4000 or finer and preferably of #12000 or finer. The surface finish can be adjusted by polishing the surface with a ultrasonic grinding machine or manually by using a diamond file, a whetstone, a ceramic stone, a ruby stone, a GC grindstone or the like.

Besides, a steel material for the used mold is preferably quenched and tempered steel with a hardness of 40 HRC or more and more preferably 50 HRC or more. Instead of polishing the mold, a chrome plated die can be used, or a mold which is polished as described above and plated with chrome can be used.

The uncoated housing of the present invention is molded at a mold temperature of 60 to 150° C. The mold temperature is more preferably 60 to 100° C. When the mold temperature falls in this range, the surface of the resulting housing can attain excellent gloss.

In general, when a cavity surface temperature is high, time required for cooling becomes long and hence a molding cycle becomes disadvantageously long. Therefore, the rapid heat cycle molding in which the cavity surface is heated and cooled in short time is preferably employed.

In the thermoplastic resin composition (D) used in the present invention, additives such as UV absorbers and antioxidants prepared from phosphite, hindered phenol, benzotriazole, benzophenone, benzoate and cyanoacrylate; lubricants and plasticizers prepared from higher fatty acids, acid esters, acid amides, higher alcohols and the like; a mold release agent of montanoic acid, a salt thereof, an ester thereof or a half ester thereof, stearyl alcohol, steramide, ethylene wax or the like; a color protection agent of phosphite, hypophosphite or the like; a nucleating agent; an antistatic agent prepared from amine, sulfonic acid, polyether or the like; and a phosphorus flame retardant of 1,3-phenylenebis(2,6-dimethylphenyl=phosphate), tetraphenyl-m-phenylenebisphosphate, phenoxyphosphoryl, phenoxyphosphazene or the like, or halogen flame retardant can be used as long as the effects of the present invention are not impaired.

The thermoplastic resin composition (D) used in the present invention can be prepared by, for example, a melt kneading method using a mixer such as an open roll mixer, an intensive mixer, an internal mixer, a Ko-kneader, a twin rotor continuous mixer or an extruder. Among these, a single screw or twin screw extruder is preferably used.

For preparing the thermoplastic resin composition (D) used in the present invention, all the components can be supplied to the same supply port at one time, or the components can be supplied respectively through different supply ports. For example, an extruder having two supply ports can be used for the melt kneading, with different components supplied respectively through a main supply port disposed on a side of a base of a screw and through a sub supply port disposed between the main supply port and a tip of the extruder.

If different components are supplied through the same supply port, these components is precedently mixed before putting them in an extruder hopper for kneading.

Moreover, in producing the thermoplastic resin composition (D) through the extrusion, the volatile component is preferably sucked through, for example, a vent port provided between a center portion of the cylinder of a twin screw extruder and a tip of the extruder at a degree of vacuum of −100 to −800 hPa from the viewpoint of moldability. The extruded resin composition can be directly cut into pellets or formed into strands so as to be subsequently cut into pellets with a pelletizer. The pellets can be in a general shape such as a cylindrical shape, a prism shape or a spherical shape, and cylindrical pellets are suitably employed.

The housing of the present invention is molded with an injection molding machine. As the injection molding, injection compression molding, gas-assisted molding using a nitrogen gas or a carbon dioxide gas, rapid heat cycle molding or the like can be employed. These molding processes can be employed in combination. Preferably, the gas-assisted molding, the rapid heat cycle molding or a combination of the gas-assisted molding and the rapid heat cycle molding is employed. The gas-assisted molding herein means injection molding using a gas or carbon dioxide gas, and examples of this process are a method as described in JP 57-14968 B or the like in which a compressed gas is injected into a molding after a resin is injected into a mold cavity, a method as described in Japanese Patent No. 3819972 or the like in which a compressed gas is inspissated into a cavity corresponding to one face of a molding after injecting a resin into a mold cavity, and a method as described in Japanese Patent No. 3349070 in which a gas is precedently filled in a thermoplastic resin prior to molding. The molding method to be employed is varied depending upon the shape of a molded article. If, for example, sink marks and warping are largely caused, gas-assisted molding, rapid heat cycle molding or the like is selected, and among such methods, a method in which a compressed gas is injected into a cavity corresponding to one face of a molding is preferably employed.

In the present invention, dwell pressure application for preventing sink marks and warping is preferably performed in a gas-assisted manner. If the dwell pressure application for preventing sink marks and warping is performed by using a resin, since the mold temperature is comparatively high, burrs are easily caused, and in addition, sink marks and warping can not be prevented unless time for applying the dwell pressure is long.

The housing of the present invention is an exterior (cover) of a device having some mechanical or electrical function. Examples of the use are a household electrical appliance, an office automation appliance, housing and facility equipment and a vehicle appliance. Specific examples of the use as the household electrical appliance are exteriors of a vacuum cleaner, a washing machine, a refrigerator, a microwave oven, a rice cooker, an electric kettle, a telephone, a coffee maker, a liquid crystal or plasma television set, a visual recorder, an audio stereo system, a cellular phone including a smart phone, a non-portable game machine, a portable game machine, a remote controller and the like, and exteriors of attachments of these. Specific examples of the use as the office automation appliance are exteriors of a multifunctional machine such as faxing and copying functions, a liquid crystal monitor, a printer, a personal computer and the like, and exteriors of attachments of these. Specific examples of the use as the housing and facility equipment are exteriors of a built-in kitchen unit, a washing stand, a bath module and the like, and exteriors of attachments of these. Specific examples of the use as the vehicle appliance are garnish covers of vehicle interior components, such as exteriors of a gear lever indicator cover, a door handle frame, a power window switch frame, a center cluster, a frame of a car stereo system or a car navigation system, a center pillar cover and the like, and exteriors of attachments of these.

The housing of the present invention may be in any of various shapes and sizes ranging from a thin shape like a plate-shape to a thick shape having a three-dimensional thickness, or from a polygonal shape having sharp corners to a shape having curved surfaces. The size thereof also ranges from a small size covered by a range of 10×10×10 mm to a large size covered by a range of 300×100×100 mm.

EXAMPLES

Examples is described below. Evaluation was conducted in accordance with the following methods. Besides, test pieces were prepared at a cylinder temperature of 240° C. and an injection speed of 10 mm/s unless otherwise mentioned.

(1) Color Tone (L* Value)

A flat plate of 90 mm×50 mm×2.5 mm was used as a test piece, and an L* value was measured by using S&M COLOUR COMPUTER MODEL SM-5 manufactured by Suga Test Instruments Co., Ltd.

Measurement conditions in conformity with JIS K7105 were employed. The L* value is a brightness index and corresponds to L* of the L*a*b* color system of CIE 1976.

(2) Gloss

A flat plate of 90 mm×50 mm×2.5 mm was used as a test piece, and a gloss was measured by using S&M COLOUR COMPUTER MODEL SM-5 manufactured by Suga Test Instruments Co., Ltd.

Measurement conditions in conformity with JIS K7105 were employed. The gloss herein is 60-degree specular gloss.

(3) Haze Value

A flat plate of 90 mm×50 mm×2.5 mm was used as a test piece, and a haze value was measured by using Haze-Gard II manufactured by Toyo Seiki Seisaku-Sho Ltd. Measurement conditions in conformity with JIS K7105 were employed.

(4) Falling Dart Impact Resistance (J)

A flat plate with a size of 50 mm×90 mm and a thickness of 2.5 mm was prepared at a cylinder temperature of 220° C. and a mold temperature of 60° C. by using an injection molder, and falling dart impact 50% destruction energy was evaluated in accordance with JIS K7211-1976.

(5) Notched Charpy Impact Test

A test piece having been subjected to a notch treatment in a prescribed size was prepared according to ISO 179. An average of values obtained in five test pieces was used as a test value.

(6) Fiber Abrasion Test

A black flat plate of 90 mm×50 mm×2.5 mm was used as a test piece, and a continuously rubbing operation for a surface of the molded article with fiber was performed by using a Gakushin-type rubbing tester. Eight sheets of tissue paper (Ellemoi Tissue Paper, manufactured by Kamishoji Corporation) which were piled and then folded by three times were used as the fiber. The rubbing was performed through 20 reciprocating motions in a direction along which the fiber could be easily torn with a rubbing load of 500 g at a stroke of 60 mm at a speed of 50 mm/sec.

Before and after the continuously rubbing operation, the L* value of the surface of the molded article was measured so as to check change thereof.

Here, the L* value is a brightness index and corresponds to L* of the L*a*b* color system of CIE 1976, and was measured by using S&M Colour Computer Model SM-5 manufactured by Suga Test Instruments Co., Ltd.

(7) Measurement of Mass Average Particle Size

The acetone insoluble resin component (A) was taken out of a molded article, and an ultrathin section having a thickness of 60 nm±2 nm was cut out therefrom. The ultrathin section was dyed with, for example, osmic acid, and the resulting section was observed with a transmission electron microscope (TEM). A mass average particle size was obtained by analyzing a microphotograph with image analysis software.

(8) Measurement of Coefficient of Linear Expansion

The acetone insoluble resin component (A) was subjected to compression molding at 260° C. and a pressure of 80 kg/cm$^2$ to give a sample with a thickness of 5 mm, and the coefficient of linear expansion of the thus obtained sample was measured by using TMA in a temperature range of −30° C. to 60° C. according to ASTM D696.

(9) Composition Analysis

In identification of the content of the unsaturated nitrile monomer-derived component in the acetone soluble resin component (B), a calibration curve was precedently prepared on the basis of a component ratio of an unsaturated nitrile monomer, which was calculated based on an integrated value of a nitrile group and an integrated value of a functional group representing a monomer copolymerizable with the unsaturated nitrile monomer by carbon nuclear magnetic resonance measurement ($^{13}$C-NMR), and a ratio in absorbance, measured with a Fourier transform infrared spectrophotometer (FT-IR), between a nitrile group and the functional group representing the monomer copolymerizable with the unsaturated nitrile monomer. This calibration curve was used for calculating a component ratio of the unsaturated nitrile monomer on the basis of the FT-IR measurement result.

(10) Reduced Viscosity

The thermoplastic resin composition (D) was dissolved in acetone, and the resulting solution was separated into the acetone soluble resin component (B) and the acetone insoluble resin component (A) by using a centrifuge. A sample solution prepared by dissolving 0.25 g of the dried acetone soluble resin component (B) in 50 ml of 2-butanone was used for obtaining the reduced viscosity by measuring efflux time in a Cannon-Fenske type capillary at 30° C.

(11) Surface Roughness

The surface roughness was measured by using Surfcom 570A-3D (a surface roughness and contour measuring instrument) manufactured by Tokyo Seimitsu Co., Ltd.

(12) Measurement of Molecular Weight and Molecular Weight Distribution of Acetone Soluble Resin Component (B)

Evaluation was conducted by the gel permeation chromatography (GPC).

The GPC conditions were as follows:

Measurement apparatus: Gel permeation chromatography (LC-908) manufactured by Japan Analytical Industry Co., Ltd.

Column: JAIGEL-4H column and two JAIGEL-2H columns connected in series

Detector: RI (differential refraction) detector

Detection sensitivity: 2.4 µV/sec

Incidentally, monodisperse styrene resins (each having a mass average molecular weight of 1020 to 1,900,000) having known mass average molecular weights and different in molecular weight are used as standard samples for preparing a calibration curve.

Preparation Example 1 for Graft Copolymer (G)

(G-1)

A polymerization reaction vessel was charged with 110 parts by mass of polybutadiene rubber latex (mass average particle size, measured with a microtrac grain size analysis instrument "nanotrac 150" manufactured by Nikkiso Co., Ltd.: 0.28 µm, solid content: 40 parts by mass), 0.1 part by mass of tertiary dodecyl mercaptan and 25 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 12 parts by mass of acrylonitrile, 48 parts by mass of styrene, 0.5 part by mass of tertiary dodecyl mercaptan and 0.15 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried, so as to give a polymer (G-1), Thereafter, the polymer (G-1) was treated with acetone so as to give an acetone insoluble resin component (A-1) and an acetone soluble component (b-1), Ratios of the polymer (A-1) and the copolymer (b-1) in (G-1) were 70 mass % and 30 mass %. As a result of the composition analysis with a Fourier transform infrared spectrophotometer (FT-IR), the polymer (A-1) was found to contain 8.6 parts by mass of acrylonitrile, 57.1 parts by mass of butadiene and 34.3 parts by mass of styrene, and have a graft ratio of 75.1% and a coefficient of linear expansion of $16.0 \times 10^{-5}/°$ C., and the copolymer (b-1) was found to contain 20.1 parts by mass of acrylonitrile and 79.9 parts by mass of styrene, and the copolymer (b-1) was found to have reduced viscosity of 0.33 dl/g.

Preparation Example 2 for Graft Copolymer (G)
(G-2)

A polymerization reaction vessel was charged with 110 parts by mass of polybutadiene rubber latex (mass average particle size, measured with a microtrac grain size analysis instrument "nanotrac 150" manufactured by Nikkiso Co., Ltd.: 0.16 μm, solid content: 40 parts by mass), 0.05 part by mass of tertiary dodecyl mercaptan and 45 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 21 parts by mass of acrylonitrile, 39 parts by mass of styrene, 0.05 part by mass of tertiary dodecyl mercaptan and 0.3 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (G-2). Thereafter, the polymer (G-2) was treated with acetone so as to give an acetone insoluble resin component (A-2) and an acetone soluble component (b-2). Ratios of the polymer (A-2) and the copolymer (b-2) in (G-2) were 87.9 mass % and 12.1 mass %. As a result of the composition analysis with a Fourier transform infrared spectrophotometer (FT-IR), the polymer (A-2) was found to contain 19.1 parts by mass of acrylonitrile, 45.5 parts by mass of butadiene and 35.4 parts by mass of styrene, and have a graft ratio of 119.8% and a coefficient of linear expansion of $13.5 \times 10^{-5}/°$ C., and the copolymer (b-2) was found to contain 34.8 parts by mass of acrylonitrile and 65.2 parts by mass of styrene, and the copolymer (b-2) was found to have reduced viscosity of 0.58 dl/g.

Preparation Example 3 for Graft Copolymer (G)
(G-3)

A polymerization reaction vessel was charged with 110 parts by mass of polybutadiene rubber latex (mass average particle size, measured with a microtrac grain size analysis instrument "nanotrac 150" manufactured by Nikkiso Co., Ltd.: 0.08 solid content: 40 parts by mass), 0.1 part by mass of tertiary dodecyl mercaptan and 25 parts by mass of deionized water, an atmosphere in a gas phase part was replaced with nitrogen, and the temperature was elevated to 55° C. Subsequently, while elevating the temperature to 70° C. over 1.5 hour, a monomer mixed solution consisting of 21 parts by mass of acrylonitrile, 39 parts by mass of styrene, 0.5 part by mass of tertiary dodecyl mercaptan and 0.15 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (G-3). Thereafter, the polymer (G-3) was treated with acetone so as to give an acetone insoluble resin component (A-3) and an acetone soluble component (b-3). Ratios of the polymer (A-3) and the copolymer (b-3) in (G-3) were 70 mass % and 30 mass %. As a result of the composition analysis with a Fourier transform infrared spectrophotometer (FT-IR), the polymer (A-3) was found to contain 15.1 parts by mass of acrylonitrile, 57.1 parts by mass of butadiene and 27.8 parts by mass of styrene, and have a graft ratio of 75.1% and a coefficient of linear expansion of $15.5 \times 10^{-5}/°$ C., and the copolymer (b-3) was found to contain 35.1 parts by mass of acrylonitrile and 64.9 parts by mass of styrene, and the copolymer (b-3) was found to have reduced viscosity of 0.33 dl/g.

Preparation Example 4 for Graft Copolymer (G)
(G-4)

A polymerization reaction vessel was charged with 140 parts by mass of polybutadiene rubber latex (mass average particle size, measured with a microtrac grain size analysis instrument "nanotrac 150" manufactured by Nikkiso Co., Ltd.: 0.03 μm, solid content: 50 parts by mass), 0.075 part by mass of tertiary dodecyl mercaptan and 5 parts by mass of deionized water, an atmosphere in a gas phase part was replaced with nitrogen, and the temperature was elevated to 50° C. Subsequently, while elevating the temperature to 65° C. over 1 hour, a monomer mixed solution consisting of 13.5 parts by mass of acrylonitrile, 36.5 parts by mass of styrene, 0.25 part by mass of tertiary dodecyl mercaptan and 0.1 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (G-4). Thereafter, the polymer (G-4) was treated with acetone so as to give an acetone insoluble resin component (A-4) and an acetone soluble component (b-4). Ratios of the polymer (A-4) and the copolymer (b-4) in (G-4) were 73.4 mass % and 26.6 mass %. As a result of the composition analysis with a Fourier transform infrared spectrophotometer (FT-IR), the polymer (A-4) was found to contain 8.6 mass % of acrylonitrile, 68.1 mass % of butadiene and 23.3 mass % of styrene, and have a graft ratio of 46.8% and a coefficient of linear expansion of $17.9 \times 10^{-5}/°$ C., and the copolymer (b-4) was found to contain 27.1 mass % of acrylonitrile and 72.9 mass % of styrene, and the copolymer (b-4) was found to have reduced viscosity of 0.38 dl/g.

Preparation Example 5 for Graft Copolymer (G)
(G-5)

A polymerization reaction vessel was charged with 95 parts by mass of polybutadiene rubber latex (mass average particle size, measured with a microtrac grain size analysis instrument "nanotrac 150" manufactured by Nikkiso Co., Ltd.: 0.16 µm, solid content: 15 parts by mass), 0.1 part by mass of tertiary dodecyl mercaptan and 25 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 55 parts by mass of methyl methacrylate, 5.5 parts by mass of acrylonitrile, 24.5 parts by mass of styrene, 0.1 part by mass of tertiary dodecyl mercaptan and 0.05 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C. To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (0-5). Thereafter, the polymer (G-5) was treated with acetone so as to give an acetone insoluble resin component (A-5) and an acetone soluble component (b-5). Ratios of the polymer (A-5) and the copolymer (b-5) in (0-5) were 20 mass % and 80 mass %. As a result of the composition analysis with a Fourier transform infrared spectrophotometer (FT-IR), the polymer (A-5) was found to contain 16.2 parts by mass of methyl methacrylate, 1.6 parts by mass of acrylonitrile, 75 parts by mass of butadiene and 7.2 parts by mass of styrene, and have a graft ratio of 33.3% and a coefficient of linear expansion of $19.2 \times 10^{-5}$/° C., and the copolymer (b-5) was found to contain 64.7 parts by mass of methyl methacrylate, 6.5 parts by mass of acrylonitrile and 28.8 parts by mass of styrene, and the copolymer (b-5) was found to have reduced viscosity of 0.42 dl/g.

Preparation Example 6 for Graft Copolymer (G) (G-6)

A polymerization reaction vessel was charged with 110 parts by mass of polybutadiene rubber latex (mass average particle size, measured with a microtrac grain size analysis instrument "nanotrac 150" manufactured by Nikkiso Co., Ltd.: 0.35 µm, solid content: 40 parts by mass), 0.1 part by mass of tertiary dodecyl mercaptan and 25 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 18 parts by mass of acrylonitrile, 42 parts by mass of styrene, 0.5 part by mass of tertiary dodecyl mercaptan and 0.15 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C. To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (G-6). Thereafter, the polymer (G-6) was treated with acetone so as to give an acetone insoluble resin component (A-6) and an acetone soluble component (b-6). Ratios of the polymer (A-6) and the copolymer (b-6) in (G-6) were 70 mass % and 30 mass %. As a result of the composition analysis with a Fourier transform infrared spectrophotometer (FT-IR), the polymer (A-6) was found to contain 9.1 parts by mass of acrylonitrile, 69.7 parts by mass of butadiene and 21.2 parts by mass of styrene, and have a graft ratio of 43.5% and a coefficient of linear expansion of $18.0 \times 10^{-5}$/° C., and the copolymer (b-6) was found to contain 30.1 parts by mass of acrylonitrile and 69.9 parts by mass of styrene, and the copolymer (b-6) was found to have reduced viscosity of 0.35 dl/g.

Preparation Example 1 for Copolymer in Acetone Soluble Resin Component (B) (E-1)

A solution to be supplied to a reaction vessel was prepared by bubbling, with a nitrogen gas, a mixture consisting of 31 parts by mass of acrylonitrile, 31 parts by mass of styrene, 8 parts by mass of butyl acrylate, 30 parts by mass of toluene serving as a solvent, and 0.05 part by mass of t-butylperoxy-2-ethylhexanoate serving as a polymerization initiator. The thus obtained solution was supplied, by using a spray nozzle, continuously at a speed of 37.5 kg/hr to a reaction vessel having an internal volume of 150 l and equipped with two inclined paddle impellers (inclination angle: 45 degrees) similar to one described in Example 2 of Japanese Patent No. 3664576. It is noted that the used polymerization initiator, t-butylperoxy-2-ethylhexanoate had crosslinking efficiency E of 64. The polymerization temperature was set at 130° C., and the reaction solution was continuously drawn out in the same amount as the supplied mixed solution so as to keep a filling rate of 70 vol % of the reaction solution in the reaction vessel. A portion of the reaction vessel corresponding to a liquid phase part is equipped with a jacket for adjusting the temperature, and the jacket temperature for adjusting the temperature was 129° C. The polymerization conversion rate was 30.5 wt %/hr. The drawn reaction solution was introduced to a volatile removing apparatus kept at 250° C. and high vacuum of 10 mmHg for recovering an unreacted portion of the monomer and the organic solvent through degassing, so as to recover a copolymer (E-10) as form of pellets.

As a result of the composition analysis with a Fourier transform infrared spectrophotometer (FT-IR), the copolymer (E-1) was found to contain 39.1 mass % of acrylonitrile, 51.1 mass % of styrene, and 9.8 mass % of butyl acrylate. Besides, the reduced viscosity was 0.42 dl/g.

Preparation Example 2 for Copolymer in Acetone Soluble Resin Component (B) (E-2)

A mixture consisting of 13 parts by mass of acrylonitrile, 52 parts by mass of styrene, 35 parts by mass of toluene serving as a solvent, and 0.05 part by mass of t-butylperoxy-2-ethylhexanoate serving as a polymerization initiator was prepared by bubbling, with a nitrogen gas. The thus obtained solution was supplied, by using a spray nozzle, continuously at a speed of 37.5 kg/hr to a reaction vessel having an internal volume of 150 l and equipped with two inclined paddle impellers (inclination angle: 45 degrees) similar to one described in Example 2 of Japanese Patent No. 3664576. It is noted that the used polymerization initiator, t-butylperoxy-2-ethylhexanoate had crosslinking efficiency ε of 64.

The polymerization temperature was set at 130° C., and the reaction solution was continuously drawn out in the same amount as the supplied mixed solution so as to keep a filling rate of 70 vol % of the reaction solution in the reaction vessel. A portion of the reaction vessel corresponding to a liquid phase part is equipped with a jacket for adjusting the temperature, and the jacket temperature was 128° C. The stirring power requirement was 4 kW/m, and the polymerization conversion rate was 39.8 wt %/hr.

The drawn reaction solution was introduced to a volatile removing apparatus kept at 250° C. and high vacuum of 10 mmHg for recovering an unreacted portion of the monomer and the organic solvent through degassing, so as to recover a copolymer (E-2) as form of pellets.

As a result of the composition analysis with a Fourier transform infrared spectrophotometer (FT-IR), the copolymer (E-2) was found to contain 20.8 mass % of acrylonitrile and 79.2 mass % of styrene. Besides, the reduced viscosity was 0.75 dl/g.

Preparation Example 3 for Copolymer in Acetone Soluble Resin Component (B) (E-3)

To a monomer mixture consisting of 68.6 parts by mass of methyl methacrylate, 1.4 parts by mass of methyl acrylate and 30 parts by mass of ethyl benzene, 150 ppm of 1,1-di-t-butylperoxy-3,3,5-trimethylcyclohexane and 1500 ppm of n-octylmercaptan were added and homogeneously mixed.

The thus obtained solution was continuously supplied to a sealed pressure-resistant reactor having an internal volume of 10 liters, and polymerization was conducted under stirring at an average temperature of 135° C. with average residence time of 2 hours. The thus obtained polymerization solution was continuously fed to a storage tank connected to the reactor, so as to separate a polymer from unreacted portions of the monomers and solution, the polymer was continuously extruded in a molten state by an extruder, so as to obtain pellets of a copolymer (E-3).

The copolymer had reduced viscosity of 0.35 dl/g, and as a result of the composition analysis by pyrolysis gas chromatography, it was found that methyl methacrylate unit/methyl acrylate unit=98.0/2.0 (a mass ratio).

[Dye (C)]

C-1: Sumiplast (registered trademark) Red H4GR (trade name) (Solvent Red 179, sublimating temperature: 323° C.) manufactured by Sumika Chemtex Co., Ltd.

C-2: Sumiplast (registered trademark) Red HL5B (trade name) (Solvent Red 52, sublimating temperature: 288° C.) manufactured by Sumika Chemtex Co., Ltd.

C-3: Diaresin Yellow H2G (brand name) (Disperse Yellow 160, sublimating temperature: 315° C.) manufactured by Mitsubishi Chemical Corporation C-4: Sumiplast (registered trademark) Yellow HLR (trade name) (Disperse Yellow 54, sublimating temperature: 276° C.) manufactured by Sumika Chemtex Co., Ltd.

C-5: Sumiplast (registered trademark) Green G (trade name) (Solvent Green 3, sublimating temperature: 354° C.) manufactured by Sumika Chemtex Co., Ltd.

C-6: Macrolex (registered trademark) Blue RR (trade name) (Solvent Blue 97, sublimating temperature: 264° C.) manufactured by Lanxess C-7: Sumiplast (registered trademark) Blue SR (trade name) (Solvent Blue 87, sublimating temperature: 310° C.) manufactured by Sumika Chemtex Co., Ltd.

C-8: Paliogen (registered trademark) Red K3580 (trade name) (Pigment Red 149, sublimating temperature: 400° C. or more) manufactured by BASF

[Additional Component (X)]

X-1: Sun Wax E-250P (trade name) (oxidized polyethylene wax, mass average molecular weight: 10,000, acid value: 20) manufactured by Sanyo Chemical Industries, Ltd.

X-2: NUC3195 (trade name) (ethylene-vinyl acetate copolymer) manufactured by Dow Chemical Company, Japan X-3: SAK-CS-PPT-1 (trade name) (calcium stearate) manufactured by Shinagawa Chemical Industry Co., Ltd.

Example 1

Thirty-seven-point-five parts by mass of the copolymer (G-1), 35 parts by mass of the copolymer (E-2), 27.5 parts by mass of the copolymer (E-4), 0.25 part by mass of the dye (C-1), 0.002 part by mass of the dye (C-3), 0.11 part by mass of the dye (C-5), 0.23 part by mass of the dye (C-7), 0.5 part by mass of the additional component (X-1) and 0.5 part by mass of the additional component (X-3) were mixed, and the resultant mixture was charged in an extruder hopper and was kneaded so as to obtain pellets of a resin composition by using a twin screw extruder (PCM-30, L/D=28, manufactured by Ikegai Tekko Kabushiki Kaisha) with a cylinder temperature set at 250° C. under conditions of a screw rotation number of 150 rpm and a discharging speed of kneaded resin of 15 kg/hr. Thereafter, the pellets were injection molded (with EC100 manufactured by Toshiba Machine Co., Ltd.) at a resin temperature of 250° C., so as to produce a flat plate with a size of 10 cm×10 cm×3 mm. A mold used in the molding had been polished with a file having a grit size of #10000 for attaining a surface having surface roughness Ra of 0.05 μm. The mold temperature was set at 65° C., and the maximum injection pressure was 1,100 kg/cm².

Examples 2 to 9 and Comparative Examples 1 to 7

Compositions and conditions listed in Table I were employed for obtaining pellets and molded articles in the same manner as described in Example 1.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Graft copolymer | G-1 | 37.5 | 60 | 80 |  |  | 37.5 |  | 37.5 |  |
|  | G-2 |  |  |  | 37.5 |  |  | 37.5 |  |  |
|  | G-3 |  |  |  |  | 37.5 |  |  |  |  |
|  | G-4 |  |  |  |  |  |  |  |  |  |
|  | G-5 |  |  |  |  |  |  |  |  | 100 |
|  | G-6 |  |  |  |  |  |  |  |  |  |
| Copolymer | E-1 |  |  |  | 62.5 | 62.5 |  | 62.5 |  |  |
|  | E-2 | 35 | 20 | 5 |  |  | 35 |  | 35 |  |
|  | E-3 | 27.5 | 20 | 15 |  |  | 27.5 |  | 27.5 |  |
| Dye | C-1 | 0.25 | 0.25 | 0.25 |  |  |  |  | 0.25 | 0.25 |
|  | C-2 |  |  |  | 0.25 | 0.25 | 0.25 |  |  |  |

TABLE 1-continued

|  |  |  |  |  |  |  |  |  |  |  |
|---|---|---|---|---|---|---|---|---|---|---|
|  | C-3 | 0.002 | 0.002 | 0.002 |  |  | 0.002 |  | 0.002 | 0.002 |
|  | C-4 |  |  |  | 0.002 | 0.002 |  | 0.002 |  |  |
|  | C-5 | 0.11 | 0.11 | 0.11 | 0.11 | 0.11 | 0.11 | 0.11 | 0.11 | 0.11 |
|  | C-6 |  |  |  |  |  |  |  |  |  |
|  | C-7 | 0.23 | 0.23 | 0.23 |  |  | 0.25 | 0.24 | 0.23 | 0.23 |
|  | C-8 |  |  |  | 0.24 | 0.24 |  |  |  |  |
|  |  |  |  |  |  |  | 0.51 |  |  |  |
| Additional | X-1 | 0.5 | 0.5 | 0.5 | 0.5 | 0.5 | 0.5 |  |  | 0.5 |
| component | X-2 |  |  |  |  |  |  | 0.5 |  |  |
|  | X-3 | 0.5 | 0.5 | 0.5 | 0.5 | 0.5 | 0.5 | 0.5 |  | 0.5 |
| Acetone insoluble resin component (A) | mass % | 26 | 42 | 56 | 33 | 26 | 26 | 33 | 26 | 20 |
| Acetone soluble resin component (B) | mass % | 74 | 58 | 44 | 67 | 74 | 74 | 67 | 74 | 80 |
| Mass average particle size | μm | 0.28 | 0.28 | 0.28 | 0.16 | 0.08 | 0.28 | 0.18 | 0.28 | 0.16 |
| Ratio of unsaturated nitrile monomer | mass % | 12.6 | 13.2 | 13.2 | 39.0 | 38.0 | 12.6 | 38.0 | 12.6 | 6.5 |
| Number of peaks | peak(s) | 3 | 3 | 3 | 2 | 2 | 3 | 2 | 3 | 1 |
| Ratio of component with molecular weight of 70,000 or less | mass % | 5 | 12 | 17 | 8 | 11 | 5 | 8 | 5 | 15 |
| Mold surface roughness (Ra) | — | 0.05 | 0.05 | 0.05 | 0.05 | 0.05 | 0.05 | 0.05 | 0.05 | 0.05 |
| Mold temperature | °C. | 60 | 60 | 60 | 60 | 60 | 60 | 60 | 60 | 60 |
| Maximum injection pressure | kg/cm$^2$ | 1,100 | 1,100 | 1,100 | 1,050 | 950 | 1,050 | 1,050 | 1,100 | 1,100 |
| Color tone (*L) | — | 10.0 | 10.1 | 10.5 | 9.9 | 9.1 | 11.0 | 10.1 | 9.7 | 10.1 |
| Gloss | % | 90 | 85 | 83 | 81 | 95 | 90 | 92 | 90 | 90 |
| Haze value | % | 43.4 | 45.7 | 47.1 | 46.2 | 85.3 | 85.3 | 45.3 | 42.5 | 43.1 |
| Falling dart impact resistance | J | 4.5 | 5.2 | 5.9 | 5.5 | 4.2 | 4.6 | 5.5 | 4.5 | 3.0 |
| Charpy impact strength | kJ/m$^2$ | 9.3 | 13.5 | 19.4 | 10.4 | 6.1 | 9.4 | 10.6 | 9.4 | 4.5 |
| Fiber abrasion test | % | 37 | 48 | 52 | 24 | 18 | 34 | 25 | 51 | 51 |

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Graft copolymer | G-1 |  | 37.5 | 37.5 | 37.5 | 80 | 70 |  |
|  | G-2 |  |  |  |  |  |  |  |
|  | G-3 |  |  |  |  |  |  |  |
|  | G-4 | 37.5 |  |  |  |  |  |  |
|  | G-5 |  |  |  |  |  |  |  |
|  | G-6 |  |  |  |  |  |  | 37.5 |
| Copolymer | E-1 |  |  |  |  |  |  |  |
|  | E-2 | 35 | 10 | 35 | 35 | 10 |  | 35 |
|  | E-3 | 27.5 | 52.5 | 27.5 | 27.5 |  | 30 | 27.5 |
| Dye | C-1 | 0.25 | 0.25 | 0.25 | 0.25 | 0.25 | 0.25 | 0.25 |
|  | C-2 |  |  |  |  |  |  |  |
|  | C-3 | 0.002 | 0.002 | 0.002 | 0.002 | 0.002 | 0.002 | 0.002 |
|  | C-4 |  |  |  |  |  |  |  |
|  | C-5 | 0.11 | 0.11 | 0.11 | 0.11 | 0.11 | 0.11 | 0.11 |
|  | C-6 | 0.24 | 0.24 |  |  |  |  |  |
|  | C-7 |  |  | 0.23 | 0.23 | 0.23 | 0.23 | 0.23 |
|  | C-8 |  |  |  |  |  |  |  |
| Additional component | X-1 | 0.5 | 0.5 | 0.5 | 0.5 | 0.5 | 0.5 | 0.5 |
|  | X-2 |  |  |  |  |  |  |  |
|  | X-3 | 0.5 | 0.5 | 0.5 | 0.5 | 0.5 | 0.5 | 0.5 |
| Acetone insoluble resin component (A) | mass % | 28 | 26 | 26 | 26 | 63 | 49 | 26 |
| Acetone soluble resin component (B) | mass % | 72 | 74 | 74 | 74 | 37 | 51 | 74 |
| Mass average particle size | μm | 0.03 | 0.28 | 0.28 | 0.28 | 0.28 | 0.28 | 0.35 |
| Ratio of unsaturated nitrile monomer | mass % | 10.6 | 5.8 | 12.6 | 12.6 | 20.2 | 8.2 | 14.5 |
| Number of peaks | peak(s) | 3 | 3 | 3 | 3 | 2 | 2 | 3 |
| Ratio of component with molecular weight of 70,000 or less | mass % | 5 | 9 | 5 | 5 | 12 | 21 | 5 |
| Mold surface roughness (Ra) | — | 0.05 | 0.05 | 0.15 | 0.05 | 0.05 | 0.05 | 0.05 |
| Mold temperature | °C. | 60 | 80 | 60 | 45 | 60 | 60 | 60 |
| Maximum injection pressure | kg/cm$^2$ | 1,100 | 1,050 | 1,100 | 1,400 | 1,200 | 1,150 | 1,100 |
| Color tone (*L) | — | 9.8 | 15.3 | 12.3 | 13.3 | 15.5 | 10.4 | 15.6 |
| Gloss | % | 87 | 90 | 58 | 55 | 75 | 84 | 58 |
| Haze value | % | 43.7 | 94.8 | 75.3 | 74.2 | 95.6 | 46.5 | 96.5 |
| Falling dart impact resistance | J | 3.9 | 3.7 | 4.5 | 4.3 | 6.5 | 3.8 | 5.6 |
| Charpy impact strength | kJ/m$^2$ | 4.7 | 4.5 | 9.3 | 9.1 | 20.5 | 4.8 | 12.2 |
| Fiber abrasion test | % | 31 | 45 | 37 | 43 | 55 | 52 | 57 |

INDUSTRIAL APPLICABILITY

The housing of the present invention is excellent in enamel touch with surface gloss and a sense of depth and in impact resistance, and therefore, it can be used as a decorated frame for a luxurious household electrical appliance, a game machine, a camera, a cellular phone, a television set or the like, or a housing for an interior member of a vehicle. Applicable household electrical appliances are a television set, a telephone, a printer, a computer, a vacuum cleaner, a loud speaker and the like, and applicable interior materials for a vehicle are a center cluster, a switch board, a pillar and the like.

The invention claimed is:

1. An uncoated housing using a molded article made of a thermoplastic resin composition (D) comprising:
    20 to 60% by mass of an acetone insoluble resin component (A) that contains a rubber component (a) having a mass average particle size of 0.05 to 0.3 μm and has a coefficient of linear expansion of $11 \times 10^{-5}$ to $20.5 \times 10^{-5}/°$ C.;
    40 to 80% by mass of an acetone soluble resin component (B) (wherein a content of the component (A)+a content of the component (B)=100% by mass); and
    a coloring agent (C),
    wherein (1) the acetone soluble resin component (B) contains 6.0 to 45% by mass of an unsaturated nitrile monomer-derived component,
    (2) the acetone soluble resin component (B) contains 2 to 20% by mass of a component having a molecular weight, measured by gel permeation chromatography (GPC), of 70,000 or less, and
    the housing has an L* value, according to JIS K7105, of 13 or less, a gloss of 60 to 120%, and a haze value of 30 to 90%.

2. The uncoated housing according to claim 1,
    wherein the acetone soluble resin component (B) shows at least two peaks in a region of a molecular weight of 10,000 to 300,000 in GPC measurement.

3. The uncoated housing according to claim 1,
    wherein a falling dart impact 50% destruction energy according to JIS K7211-1976 of the thermoplastic resin composition (D) is 4.0 J or more.

4. The uncoated housing according to claim 1,
    wherein the coloring agent (C) is a mixture of dyes of at least 4 or more colors, and a sublimation starting temperature of each of the dyes is 210 to 400° C.

5. A method for producing the uncoated housing according to claim 1,
    wherein molding is performed at a mold temperature of 60 to 150° C. and an injection pressure of 300 to 1300 kg/cm² or less by using a mold having surface roughness Ra of 0.1 or less.

6. The uncoated housing according to claim 1 or 2,
    wherein an increase rate of the L* value in a fiber abrasion test is 60% or less.

* * * * *